US008219111B2

(12) United States Patent
Guvenc et al.

(10) Patent No.: US 8,219,111 B2
(45) Date of Patent: Jul. 10, 2012

(54) METHOD FOR AN IMPROVED LINEAR LEAST SQUARES ESTIMATION OF A MOBILE TERMINAL'S LOCATION UNDER LOS AND NLOS CONDITIONS AND USING MAP INFORMATION

(75) Inventors: Ismail Guvenc, Santa Clara, CA (US); Fujio Watanabe, Union City, CA (US); Hiroshi Inamura, Cupertino, CA (US)

(73) Assignee: NTT DoCoMo, Tokyo (JP)

( * ) Notice: Subject to any disclaimer, the term of this patent is extended or adjusted under 35 U.S.C. 154(b) by 683 days.

(21) Appl. No.: 12/202,611

(22) Filed: Sep. 2, 2008

(65) Prior Publication Data

US 2009/0069029 A1 Mar. 12, 2009

Related U.S. Application Data

(60) Provisional application No. 60/971,710, filed on Sep. 12, 2007, provisional application No. 60/977,542, filed on Oct. 4, 2007.

(51) Int. Cl.
*H04W 4/00* (2009.01)

(52) U.S. Cl. ............... 455/456.1; 455/404.2; 455/456.2; 455/456.5; 455/457; 342/126; 342/357.27; 342/357.38; 342/450

(58) Field of Classification Search ....... 455/456.1–457, 455/404.2

See application file for complete search history.

(56) References Cited

U.S. PATENT DOCUMENTS

| | | | |
|---|---|---|---|
| 6,236,365 B1 * | 5/2001 | LeBlanc et al. | 342/457 |
| 6,266,014 B1 * | 7/2001 | Fattouche et al. | 342/450 |
| 6,985,542 B1 * | 1/2006 | Nir et al. | 375/343 |
| 7,203,497 B2 | 4/2007 | Belcea | |
| 7,215,966 B2 | 5/2007 | Joshi | |
| 7,663,547 B2 * | 2/2010 | Ho et al. | 342/387 |
| 2008/0242316 A1 * | 10/2008 | Wang et al. | 455/456.2 |
| 2009/0213000 A1 * | 8/2009 | Gross et al. | 342/357.03 |
| 2010/0093377 A1 * | 4/2010 | Riley et al. | 455/456.6 |

OTHER PUBLICATIONS

J. J. Caffery and G. L. Stuber, "Overview of radiolocation in CDMA cellular systems," *IEEE Commun. Mag.*, vol. 36, No. 4, pp. 38-45, Apr. 1998.

F. Gustafsson and F. Gunnarsson, "Mobile positioning using wireless networks: Possibilites and fundamental limitations based on available wireless network measurements," *IEEE Sig. Proc. Mag.*, vol. 22, No. 4, pp. 41-53, Jul. 2005.

(Continued)

*Primary Examiner* — Anthony Addy
*Assistant Examiner* — Shahriar Behnamian
(74) *Attorney, Agent, or Firm* — Haynes & Boone, LLP.

(57) ABSTRACT

A linear least squares (LLS) estimator provides a low complexity estimation of the location of a mobile terminal (MT), using one of the fixed terminals (FTs) as a reference FT to derive a linear model. A method for selecting a reference FT is disclosed, which improves the location accuracy relative to an arbitrary approach to selecting the reference FT. In addition, a covariance-matrix based LLS estimator is proposed in line-of-sight (LOS) and non-LOS (NLOS) environments to further provide accuracy, taking advantage of the correlation of the observations. Different techniques for selecting the reference FT under non-LOS (NLOS) conditions are disclosed. A map-based two-stage LLS estimator assists in selecting the reference FT under NLOS conditions.

16 Claims, 7 Drawing Sheets

OTHER PUBLICATIONS

W. Kim, J. G. Lee, and G. I. Jee, "The interior-point method for an optimal treatment of bias in trilateration location," *IEEE Trans. Vehic. Technol.*, vol. 55, No. 4, pp. 1291-1301, Jul. 2006.

J. J. Caffery, "A new approach to the geometry of TOA location," in *Proc. IEEE Vehic. Technol. Conf. (VTC)*, vol. 4, Boston, MA, Sep. 2000, pp. 1943-1949.

S. Venkatesh and R. M. Buehrer, "A linear programming approach to NLOS error mitigation in sensor networks," in *Proc. IEEE IPSN*, Nashville, Tennessee, Apr. 2006.

Z. Li, W. Trappe, Y. Zhang, and B. Nath, "Robust statistical methods for securing wireless localization in sensor networks," in *Proc. IEEE Int. Symp. Information Processing in Sensor Networks (IPSN)*, Los Angeles, CA, Apr. 2005, pp. 91-98.

V. Dizdarevic and K. Witrisal, "On impact of topology and cost function on LSE position determination in wireless networks," in *Proc. Workshop on Positioning, Navigation, and Commun. (WPNC)*, Hannover, Germany, Mar. 2006, pp. 129-138.

Y. T. Chan, H. Y. C. Hang, and P. C. Ching, "Exact and approximate maximum likelihood localization algorithms," *IEEE Trans. Vehicular Technology*, vol. 55, No. 1, pp. 10-16, Jan. 2006.

S. Gezici and Z. Sahinoglu, "UWB geolocation techniques for IEEE 802.15.4a personal area networks," MERL Technical report, Cambridge, MA, Aug. 2004.

PCT International Search Report for International Application No. PCT/US2008/075634 dated Nov. 10, 2008, 2 pages.

PCT Written Opinion of the International Searching Authority for International Application No. PCT/US2008/075634 dated Nov. 10, 2008, 4 pages.

* cited by examiner

☐ Actual MT Location      ○ Initially estimated MT location Using an Arbitrary Reference ☐ Actual MT Location      ○ Initially estimated MT location Using an Arbitrary Reference ☐ Actual MT Location      ○ Initially estimated MT location Using an Arbitrary Reference ☐ Actual MT Location      ○ Final Location Estimate After Two-Step Estimation

METHOD FOR AN IMPROVED LINEAR LEAST SQUARES ESTIMATION OF A MOBILE TERMINAL'S LOCATION UNDER LOS AND NLOS CONDITIONS AND USING MAP INFORMATION

CROSS-REFERENCE TO RELATED APPLICATIONS

The present application relates to and claims priority of (a) copending U.S. provisional patent application, entitled "Method for an Improved Linear Least Square Estimation of a Mobile Terminal's Location," Ser. No. 60/971,710, filed Sep. 12, 2007, and (b) copending U.S. provisional patent application, entitled "Improved Linear Least Square Location Estimation in NLOS Environments and Utilizing the Map Information," Ser. No. 60/977,542, filed Oct. 4, 2007. The disclosures of these copending U.S. provisional applications are hereby incorporated by reference in their entireties.

The present application is also related to copending U.S. non-provisional patent application, entitled "Weighted Least Square Localization Method Exploiting Multipath Channel Statistics for Non-Line-of-Sight Mitigation," Ser. No. 11/832,558, filed on Aug. 1, 2007. The disclosure of this copending non-provisional patent application is also hereby incorporated by reference in its entirety.

BACKGROUND OF THE INVENTION

1. Field of the Invention

The present invention relates to wireless localization technology (e.g., estimating the location of a mobile terminal in a data communication network). More particularly, the present invention relates to localization using a linear least squares (LLS) or maximum likelihood (ML) estimator.

2. Discussion of the Related Art

Numerous techniques have been developed to resolve a position of a mobile terminal (MT) from a set of measured distances. If the variance of distance measurements at each MT is available, the maximum likelihood (ML) solution can be obtained using a weighted non-linear least squares (WNLS) approach. (See, e.g., the article "Overview of Radiolocation in CDMA Cellular Systems" ("Caffery I"), by J. J. Caffery and G. L. Stuber, published in IEEE Commun. Mag., vol. 36, no. 4, pp. 38-45, April 1998.)

Alternatively, if the measured distance variances are not available, or if the variances are assumed identical, a non-linear least squares (NLS) solution can be obtained by simply setting all the weights to unitary. However, solving the NLS problem requires an explicit minimization of a loss function, and hence necessitates using numerical search methods such as steepest descent or Gauss-Newton techniques. Such numerical search techniques are computationally costly and typically require a good initialization to avoid converging to a local minimum of the loss function. (See, e.g., the article "Mobile Positioning using Wireless Networks: Possibilities and Fundamental Limitations Based on Available Wireless Network Measurements" ("Gustafsson"), by F. Gustafsson and F. Gunnarsson, published in IEEE Sig. Proc. Mag., vol. 22, no. 4, pp. 41-53, July 2005.)

The article "The Interior-point Method for an Optimal Treatment of Bias in Trilateration Location" ("Kim"), by W. Kim, J. G. Lee, and G. I. Jee, published in IEEE Trans. Vehic. Technol., vol. 55, no. 4, pp. 1291-1301, July 2006, shows that, to obtain a closed-form solution and to avoid explicit minimization of the loss function, the set of expressions corresponding to each of the observations can be linearized using a Taylor series expansion. However, such an approach still requires an intermediate location estimate to obtain the Jacobian matrix. The intermediate location estimate required under this approach has to be sufficiently close to the true location of the MT for the linearity assumption to hold.

An alternative linear least squares (LLS) solution based on the measured distances was initially proposed in the article "A New Approach to the Geometry of TOA Location" ("Caffery II"), by J. J. Caffery, published in Proc. IEEE Vehic. Technol. Conf. (VTC), vol. 4, Boston, Mass., September 2000, pp. 1943-1949. Under that approach, one of the fixed terminals (FTs) is selected as a reference. The expressions corresponding to the measured distances of this reference FT is subtracted from the other (N−1) expressions to cancel the non-linear terms, where N denotes the number of observations. Eventually, once a linear set of expressions is obtained, a simple least squares (LS) matrix solution yields the location of the MT.

Variations of the LLS solution technique are also presented in the literature. For example, in the article "A Linear Programming Approach to NLOS Error Mitigation in Sensor Networks" ("Venkatesh"), by S. Venkatesh and R. M. Buehrer, published in Proc. IEEE IPSN, Nashville, Tenn., April 2006, multiple sets of linear expressions are obtained by selecting each of the FTs as a reference FT in turn and then proceeding as described in Caffery II. This procedure provides $$\frac{N(N-1)}{2}$$

total number of unique equations, which are likely to yield a better location estimate, as compared to random selection of the reference FT.

Another example of the LLS solution technique is provided in the article "Robust Statistical Methods for Securing Wireless Localization in Sensor Networks" ("Li"), by Z. Li, W. Trappe, Y. Zhang, and B. Nath, published in Proc. IEEE Int. Symp. Information Processing in Sensor Networks (IPSN), Los Angeles, Calif., April 2005, pp. 91-98. Li proposes a different averaging technique. Under that technique, initially, the non-linear expressions are averaged over all the FTs. The resulting expression is then subtracted from the rest of the expressions to cancel out the non-linear terms. This averaging procedure yields N linear equations compared to (N−1) equations.

Another example of the LLS solution technique is provided in the article "On Impact of Topology and Cost Function on LSE Position Determination in Wireless Networks" ("Dizdarevic"), by V. Dizdarevic and K. Witrisal, published in Proc. Workshop on Positioning, Navigation, and Commun. (WPNC), Hannover, Germany, March 2006, pp. 129-138. In Dizderevic, the cost functions for LLS and NLS are compared using simulations, which show that NLS usually performs better than the LLS in most of the topologies. A similar result is also observed in Li, which clearly shows the sub-optimality of the LLS for position estimation.

While LLS is a sub-optimum location estimation technique, when reasonable position estimation accuracy is achieved, such a technique may be used to obtain the MT location, due to its lower implementation complexity, as compared to other iterative techniques (e.g., the NLS). Moreover, in other high-accuracy techniques (including the NLS approach and linearization based on the Taylor series), LLS can be used to obtain an initial location estimate for initiating the high-accuracy location algorithm (see, e.g., the article "Exact and Approximate Maximum Likelihood Localization Algorithms," by Y. T. Chan, H. Y. C. Hang, and P. C. Ching, published in IEEE Trans. Vehicular Technology, vol. 55, no. 1, pp. 10-16, January 2006.). A good initialization may considerably decrease the computational complexity and eventual localization error of a high-accuracy technique. Therefore, improving the accuracy of the LLS localization technique is important for multiple reasons.

Under these methods, the reference FT is usually randomly selected. In addition, an averaging technique is employed for linearizing the set of expression. However, such averaging does not necessarily yield better accuracy, since undesirable FTs are also used as reference FTs in the linearization process. Furthermore, these prior art solutions do not consider the covariance matrix of decision variables after linearizing the system. This omission may lead to further inaccuracy, as even in LOS environments, the observations in the linear model may become correlated—a fact that is not expressly considered in the prior art. In NLOS environments, the effects of NLOS bias may also be mitigated if certain NLOS related its statistics are available. Prior art techniques use the weighted LS estimator typically with the assumption that the observations are independent. However, the observations in LLS may become correlated.

Therefore, for both LOS and NLOS conditions, a solution technique which (a) appropriately selects the reference FT based on the measurements, (b) incorporates the covariance matrix into the LLS solution, and (c) compensates for correlated observations using the covariance matrix of observations is desired.

SUMMARY

According to one embodiment of the present invention, a linear least squares (LLS) estimator provides a low complexity estimation of the location of a mobile terminal (MT), using one of the fixed terminals (FTs) as a reference FT to derive a linear model. A method for selecting a reference FT is disclosed, which improves the location accuracy relative to an arbitrary approach to selecting the reference FT (as taught in Caffery II), or relative to averaging techniques (as taught in Venkatesh or Li). In addition, a covariance-matrix based LLS estimator is proposed in line-of-sight (LOS) and non-LOS (NLOS) environments to further provide accuracy, taking advantage of the correlation of the observations. Different techniques for selecting the reference FT under non-LOS (NLOS) conditions are disclosed. A map-based two-stage LLS estimator assists in selecting the reference FT under NLOS conditions.

According to one embodiment of the present invention, a reference FT is selected for linearization, based on the smallest measured distance. Also, a covariance-matrix based LLS estimator for LOS and NLOS conditions is disclosed and the elements of the covariance matrix are specified explicitly.

The present invention is better understood upon consideration of the detailed description below together with the accompanying drawings.

DETAILED DESCRIPTION OF THE PREFERRED EMBODIMENTS

Figure 1:
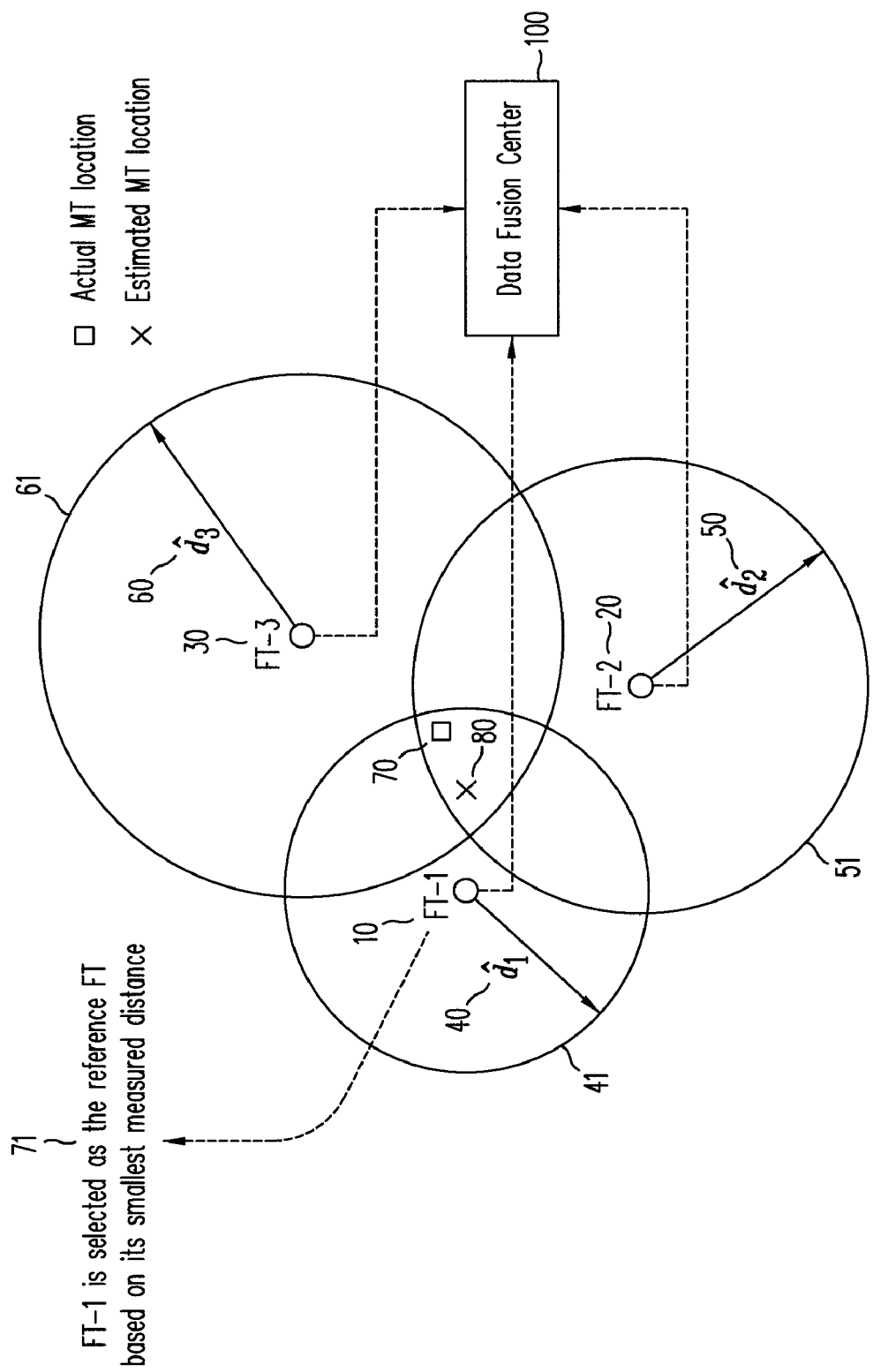
FIG. 1 shows a wireless communication system in which N fixed terminals (FTs), labeled 10, 20 and 30 respectively, are provided.

FIG. 1 shows a wireless communication system in which N fixed terminals (FTs), labeled 10, 20 and 30 respectively, are provided. As shown in FIG. 1, $x=[x,y]^T$ is an estimate of the mobile terminal (MT) location 80, $x_i=[x_i, y_i]^T$ is the position of the i-th FT, $\hat{d}_i$ is the measured distance between the MT and the i-th FT (labeled 40, 50 and 60 for each of i=1, 2 and 3). Distance $\hat{d}_i$ is modeled by:

$$\hat{d}_i = d_i + b_i + n_i = c\tau_i, \quad i=1, 2, \ldots, N \quad (1)$$

where $\tau_i$ is the measured time of arrival (TOA) of the signal at the i-th FT, $d_i$ is the actual distance between the MT and the i-th FT[1], $n_i \sim N(0, \sigma_i^2)$ is an additive white Gaussian noise (AWGN) with zero mean and variance $\sigma_i^2$ at the i-th fixed FT, and $b_i$ is a positive distance bias introduced due to LOS blockage, which is zero for LOS FTs. In this description, the measurement variance is assumed the same for all the FTs (i.e., $\sigma_i^2 = \sigma^2$). In other embodiments, the noise variances may be different.

[1] Distance $\hat{d}_i$ may also be estimated based on the received signal strengths (RSSs)

Once all the distance estimates $\hat{d}_i$ in equation (1) are available, the noisy measurements and NLOS bias at different FTs yield circles 41, 51 and 61 which do not intersect at the same point, resulting in the following inconsistent equations $$(x-x_i)^2 + (y-y_i)^2 = \hat{d}_i^2, \quad i=1, 2, \ldots, N. \quad (2)$$

One way to resolve the MT's location from equation (2) uses a non-linear weighted least squares (NL-WLS) estimation, such as disclosed in the Caffery I and Gustafsson articles above:

$$\hat{x} = \underset{x}{\operatorname{argmin}} \quad (3)$$

where the weights $\beta_i$ are chosen to reflect the reliability of the signal received at i-th FT.

Figure 2:
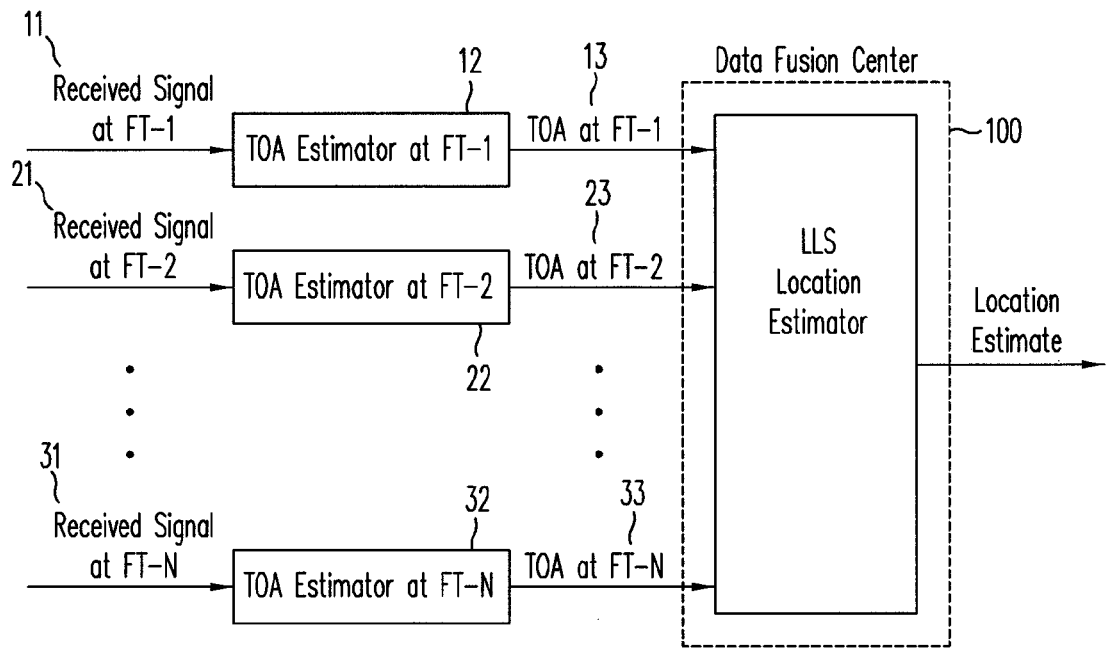
FIG. 2 is a high level block diagram showing the procedures of a linearization of the system of equations, followed by an LS solution.

Alternatively to the NL-WLS solution, techniques proposed in the Kim and Caffery II articles may be used to obtain a linear set of equations. FIG. 2 is a high level block diagram showing the procedures of a linearization of the system of equations, followed by an LS solution. As shown in FIG. 2, TOAs at each of the FT (i.e., TOAs labeled 13, 23 and 33) are estimated from the received signals at different FTs (i.e., received signals labeled 11, 21 and 31) by a TOA estimator at each FT (i.e., TOA estimators 12, 22 and 32). Using the TOAs so estimated[2], data fusion center (DFC) 100 converts the TOAs into range estimates and provides a location estimate using an LLS location estimator.

[2] As discussed above, RSSs may be used instead of the TOAs.

Figure 3:
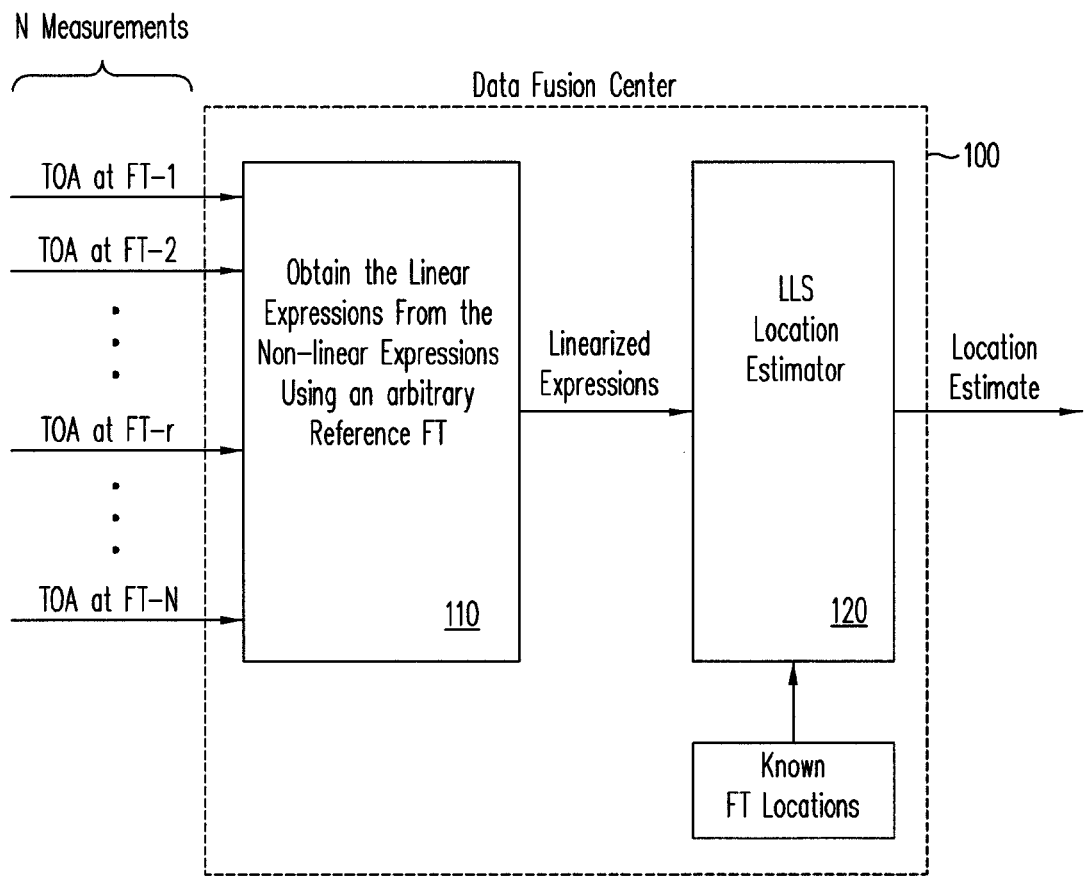
FIG. 3 is a block diagram of the procedures carried out in a conventional LLS location estimator.

FIG. 3 is a block diagram of the procedures carried out in a conventional LLS location estimator. As shown in FIG. 3, model 110 represents a linearization step in which the non-linear expressions in equations (2) are first fixed to an arbitrary reference FT, which are then subtracted from the rest of the expressions, using the conventional linearization techniques discussed above, to provide the linear system:

$$Ax = p, \quad (4)$$

where $$A = 2 \begin{bmatrix} x_1 - x_r & y_1 - y_r \\ x_2 - x_r & y_2 - y_r \\ \vdots & \vdots \\ x_{N-1} - x_r & y_{N-1} - y_r \end{bmatrix}, \quad (5)$$

and $$p = p_c + p_n, \quad (6)$$

with the constant component $p_c$ and noisy component $p_n$ respectively given by:

$$p_c = \begin{bmatrix} d_r^2 - d_1^2 - k_r + k_1 \\ d_r^2 - d_2^2 - k_r + k_2 \\ \vdots \\ d_r^2 - d_2^2 - k_r + k_N \end{bmatrix}, \quad (7)$$

$$p_n = \begin{bmatrix} 2d_r n_r - 2d_1 n_1 + n_r^2 - n_1^2 \\ 2d_r n_r - 2d_2 n_2 + n_r^2 - n_2^2 \\ \vdots \\ 2d_r n_r - 2d_N n_N + n_r^2 - n_N^2 \end{bmatrix}, \quad (8)$$

where $k_i = x_i^2 + y_i^2$ and r is the index of the reference FT selected for the linear model.

Using the linear model, and the known fixed locations of the FTs, the LS solution is provided in block 120 using:

$$\hat{x} = (A^T A)^{-1} A^T p. \quad (9)$$

Equation (9) is known as the LLS estimator.

In this description, the estimator in equation (9) will be referred to as the "LLS-1 estimator." The LLS-1 estimator uses measurements $\hat{d}_i$, i=1, ..., N, only through the terms $\hat{d}_r^2 - \hat{d}_i^2$, for i=1, ..., N and for i not equal to r. Therefore, the measurement set for LLS-1 effectively becomes $$\tilde{d}_i = \hat{d}_r^2 - \hat{d}_i^2, i=1, \ldots, N, i \neq r \quad (9\text{-}1)$$

Another LLS approach, which is referred herein as "the LLS-2 estimator," obtains $$\frac{N(N-1)}{2}$$

unique linear equations by subtracting each equation from all of the other equations[3]. For the LLS-2 estimator, the following observations are used to estimate the MT location:

$$\tilde{d}_{ij} = \hat{d}_i^2 - \hat{d}_j^2, i,j=1, \ldots, N, i<j \quad (9\text{-}2)$$

[3] This approach is disclosed, for example, in Venkatesh, discussed above.

Similar to the LLS-1 estimator, the linear LS solution provided in equation (9) provides the MT location for the LLS-2 estimator.

A third LLS estimator, referred herein as the "LLS-3 estimator," is disclosed in Li. In the LLS-3 estimator, instead of calculating the difference of the equations directly as in the LLS-1 and LLS-2 estimators, the average of the measurements is first obtained. This average is subtracted from all the equations, so as to obtain N linear relations. Then, the linear LS solution of equation (9) is then provides the MT location for the LLS-3 estimator. The observation set used in the LLS-3 estimator is provided by:

$$\tilde{d}_{ij} = \hat{d}_i^2 - \frac{1}{N} \sum_{j=1}^{N} \hat{d}_j^2, i = 1, \ldots, N \quad (9\text{-}3)$$

As discussed above, the LLS solution represented by equation (9) is based on selecting an arbitrary FT as reference. However, as shown in the noisy terms $p_n$ of equation (8), the rows of the vector $p_n$ depend on the true distance to the reference FT. Equation (8) therefore suggests that, if the reference FT is far away from the MT location, the elements of vector p are more noisy, thereby degrading the localization accuracy. The manner in which the reference FT is selected may considerably affect the estimator's mean square error (MSE).

Figure 4:
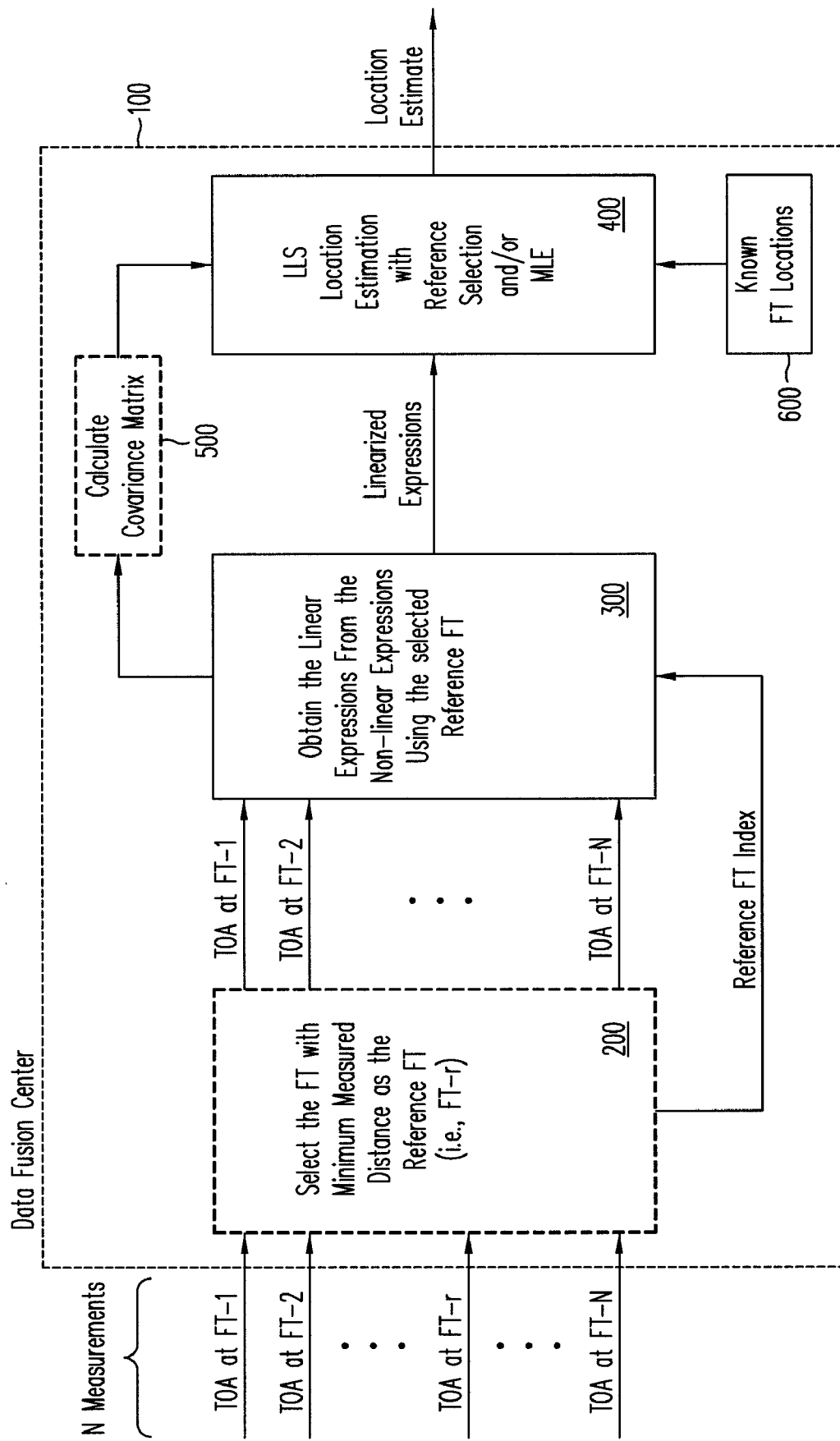
FIG. 4 illustrates an LLS location estimator with improved accuracy, according to one embodiment of the present invention.

FIG. 4 illustrates an LLS location estimator with improved accuracy, according to one embodiment of the present invention. As shown in FIG. 4, to improve localization accuracy, one method (indicated by reference numeral 200) selects the FT whose measured distance is the smallest among all the distance measurements:

$$\hat{r} = \operatorname*{argmin}_{i}(\hat{d}_i), i = 1, \ldots, N, \quad (10)$$

where $\hat{r}$ is the index of the selected reference FT. The matrix A and the vector p can be obtained using the selected reference FT ("FT-r"). The resulting estimator is referred to as LLS with reference selection ("LLS-RS").

As indicated by reference numeral 300, using the selected reference FT the system is then linearized. Block 400 represents obtaining an LLS solution based on the linear model. Referring to FIG. 1, for example, FT-1 may be selected to obtain a linear model from non-linear expressions, since $\hat{d}_1$ (indicated by reference numeral 71) is the least among all measured distances. For even better accuracy, the variance of distance measurements may be used as a second criterion for selecting the reference FT.

Merely selecting a reference FT does not account for the full correlation between the rows of the vector $p_n$, which become correlated during the linearization. This correlation is not explicitly mitigated in the prior art techniques using LLS.

The optimum estimator in the presence of correlated observations can be achieved by an ML estimator, such as discussed in the text "Fundamentals of Statistical Signal Processing: Estimation Theory" ("Kay"), by S. M. Kay, Upper Saddle River, N.J.: Prentice Hall, Inc., 1993.

Under this approach, equation (6) can be rewritten as:

$$p = Ax + p_n, \quad (11)$$

where x denotes the true location of the MT. Then, as disclosed in Kay, the ML estimator (MLE) for this linear model is given by:

$$\hat{x} = (A^T C^{-1} A)^{-1} A^T C^{-1} p, \quad (12)$$

where $C = \text{Cov}(p_n)$—i.e., the covariance matrix of vector $p_n$.

Equation (12) may be used in a covariance matrix-based LLS location estimator for finding the MT location. The covariance matrix may evaluate to (reference numeral 500):

$$C = 4d_r^2 \sigma^2 + 2\sigma^4 + \text{diag}(4\sigma^2 d_i^2 + 2\sigma^4), \quad (13)$$

for $i \in \{1, 2, \ldots, N\}$, $i \neq r$, and where $\text{diag}(\lambda_i)$ is a diagonal matrix obtained by placing $\lambda_i$ on the rows of the matrix for all i. According to Kay, the probability density function (PDF) of $\hat{X}$ may be given by:

$$\hat{x} \sim N(x, (A^T C^{-1} A)^{-1}). \quad (14)$$

Multipath or NLOS effects (i.e., obstruction of the signals along the LOS in some of the FTs) are significant effects that are modeled by an NLOS bias in the measured distances. Under NLOS conditions, perturbation in the vector p of equation (6) is much larger, so that the resulting location accuracy is much degraded relative to LOS conditions. Under NLOS conditions, the driving term is given by:

$$p = p_c + \tilde{p}_n, \quad (15)$$

where $p_c$ may be given by equation (7) and the noisy component $\tilde{p}_n$ is given by:

$$\tilde{p}_n = p_n + \tilde{b}, \quad (16)$$

with the i-th NLOS bias term of $\tilde{b}$ given by:

$$[\tilde{b}] = b_r^2 + b_i^2 + 2(d_r b_r - d_i b_i + b_r n_r - b_i n_i) \quad (17)$$

where $$\tilde{i} = \begin{cases} i, & i < r \\ i + 1, & i \geq r \end{cases}$$

If the covariance matrix under NLOS conditions is known, similar to the LOS case, equation (12) provides the MLE solution. According to one embodiment, two cases for obtaining the covariance matrix under NLOS conditions are provided. In the first case, the NLOS bias vector is assumed to be exactly known. While this assumption may be impractical, this case shows the achievable accuracies with perfect bias knowledge relative to LOS conditions. In this case, the covariance matrix is given by:

$$C = (4d_r^2 + 8d_r b_r + 4d_r^2 + 2\sigma^2)\sigma^2 + \text{diag}(\gamma_i), \quad (18)$$

where $$\gamma_i = (4b_i^2 + 8b_i d_i + 4d_i^2 + 2\sigma^2)\sigma^2. \quad (19)$$

In the second case, the perfect NLOS bias vector assumption is relaxed (i.e., only some of the FTs are under NLOS conditions with known bias distributions). This case represents more practical conditions, and can be used when some prior statistics of the NLOS bias are available. In this case, the NLOS biases can be modeled by: $b_i \sim N(\tilde{\mu}_i, \tilde{\sigma}_i^2)$ for some NLOS FTs. (Modeling of NLOS bias in this manner is discussed, for example, in Dizdarevic, discussed above). To provide analytical tractability, the NLOS bias for the reference FT may be assumed to be under LOS conditions (i.e., $b_r = 0$). The elements of the covariance matrix of $\tilde{p}_n$ can then be given by:

$$[C]_{ij} = (\tilde{\mu}_i^2 + \tilde{\sigma}_i^2)(\tilde{\mu}_j^2 + \tilde{\sigma}_j^2) + 4d_i d_j \tilde{\mu}_i \tilde{\mu}_j - \quad (20)$$
$$2(\tilde{\mu}_i^2 + \tilde{\sigma}_i^2) d_j \tilde{\mu}_j - 2(\tilde{\mu}_j^2 + \tilde{\sigma}_j^2) d_i \tilde{\mu}_i + 4d_r^2 \sigma^2 + 2\sigma^4,$$

for $i \neq j$. For $i = j$ (i.e., the diagonal elements of the covariance matrix):

$$[C]_{ii} = \quad (21)$$
$$\tilde{\mu}_i^4 + 6\tilde{\mu}_i^2 \tilde{\sigma}_i^2 + 3\tilde{\sigma}_i^4 + 4d_i^2(\tilde{\mu}_i^2 + \tilde{\sigma}_i^2) - 4d_i \tilde{\mu}_i^3 + 4(d_r^2 + d_i^2)\sigma^2 + 4\sigma^4.$$

The MLE solution of equation (12) then provides the desired location estimate.

The approach for selecting FT based on the minimum measured distance, as described above, is made more complex under NLOS conditions. In particular, the $b_r^2$, the $d_r b_r$, and the $b_r n_r$ terms in equation (17) for the reference FT may dominate. Under such conditions, selecting an NLOS biased FT as a reference FT is undesirable, even for small bias values. Therefore, the minimum distance measurement criterion is modified to include only the LOS FTs (the resulting estimator is referred to as the "LLS-RS-NLOS-1 estimator"):

$$r = \arg\min_i (\hat{d}_i), \, i \in C_{LOS}, \quad (22)$$

where $C_{LOS}$ denotes the index set for all the LOS FTs. NLOS identification techniques, such as available in the literature, may be used to determine the NLOS FTs and exclude them from set $C_{LOS}$.

Note that the geometry of the nodes and how the reference FT is placed with respect to the NLOS FT and the MT are more important under NLOS conditions. Although equation (22) excludes NLOS FTs from being selected as a reference FT, there may be circumstances (e.g., when the NLOS bias is small and when the MT is sufficiently close to an NLOS FT), when it is preferable to select an NLOS FT as the reference FT. Hence, to improve accuracy, a pre-defined threshold $d_{thr}$ on the measured distances may be used to allow selection of an NLOS FT as a reference FT. Such a selection may be made if 1) the NLOS FT's measured distance is the smallest among all measured distances, and 2) the NLOS FT's measured distance is smaller than the pre-defined threshold $d_{thr}$.

According to one embodiment of the present invention, another possible way of selecting a reference FT under NLOS conditions uses $\hat{d}_i - \hat{b}_i$ as the corrected measurements, if NLOS bias estimates $\hat{b}_i$ are available. This alternative method also uses the LOS reference selection rule if equation (22). However, obtaining the NLOS bias estimate $\hat{b}_i$ is not typically easy. Nevertheless, under certain circumstances, the statistics for $b_i$ may be available. Let $\tilde{\mu}_i = E\{b_i\}$ denote the mean of NLOS bias $b_i$, the following decision rule for reference FT selection may be used, when bias statistics are available (the resulting estimator is referred to in this description as the "LLS-RS-NLOS-2 estimator"):

$$r = \arg\min_i (\hat{d}_i - \tilde{\mu}_i), i = 1, \ldots, N, \quad (23)$$

Figure 5:
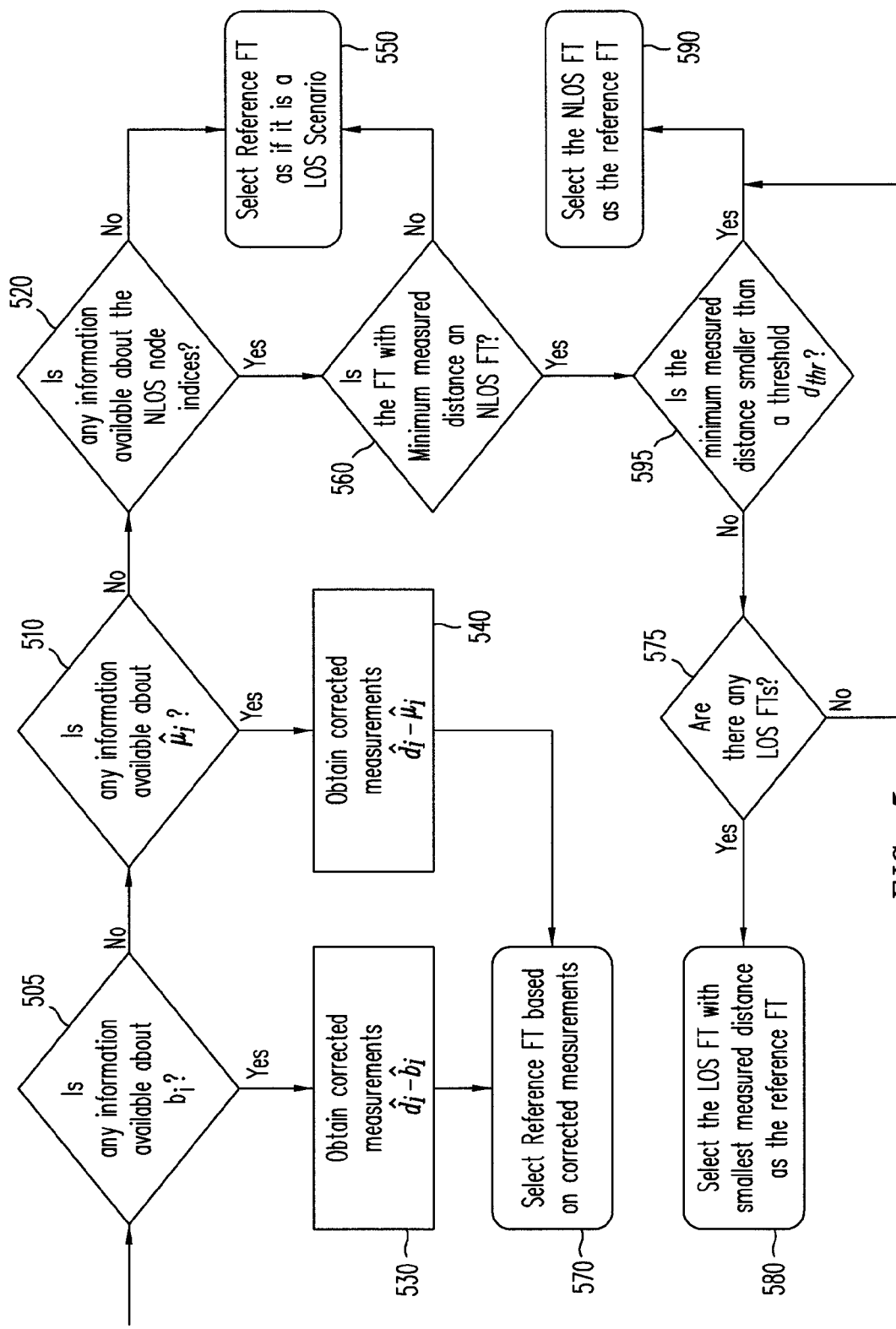
FIG. 5 is a block diagram for the selection of the reference FT under NLOS conditions, in accordance with one embodiment of the present invention.

FIG. 5 is a block diagram summarizing the above discussion for selecting the reference FT under NLOS conditions, in accordance with one embodiment of the present invention. As shown in FIG. 5, at step 505, whether or not there is information available for the exact value of the NLOS bias is first determined. If such information is available, at step 530, the bias values are subtracted from the measured distances to obtain corrected measurements. At The reference FT is then selected using these corrected measurements and the LOS decision rule of equation (10).

Similarly, at step 510, when there is information available for the mean of the NLOS bias $b_i$, the mean or expected value of NLOS bias $b_i$ is subtracted from the measurements at step 540 to obtain corrected measurements. These corrected measurements are then used at step 570 using decision rule of equation (10) to select the reference FT.

However, at step 520, if there is information neither about the NLOS bias values, nor about the NLOS bias statistics, it is then determined if it is known which FTs are under NLOS conditions. If so, at step 560, the FT with the minimum measured distance (i.e., the candidate FT) is examined for NLOS conditions. If the candidate FT is not under NLOS condition, then the decision rule of equation (17) may be used to select the reference FT at step 550. However, if the candidate FT is an NLOS FT, at step 595, the measured distance of the candidate FT is compared to pre-defined threshold $d_{thr}$. If that measured distance is less than the threshold, the NLOS FT can be selected as the reference FT (step 590). Otherwise, LOS FTs are identified (step 575). If no LOS FT is found, the NLOS FT of step 595 is selected to be the reference FT. Otherwise, the LOS FT having the least measured distance is selected as the reference FT.

As is apparent from FIG. 5, information about NLOS bias values, when available, improves the accuracy of the LLS estimator. According to one embodiment of the present invention, a two-stage LLS location estimator is provided, which uses a-priori map information to derive information about the NLOS bias of the measurements. In this method, a first stage obtains information about the NLOS biases of different measurements and, in a second stage, the NLOS bias information obtained is used for accurate reference selection.

Figure 6:
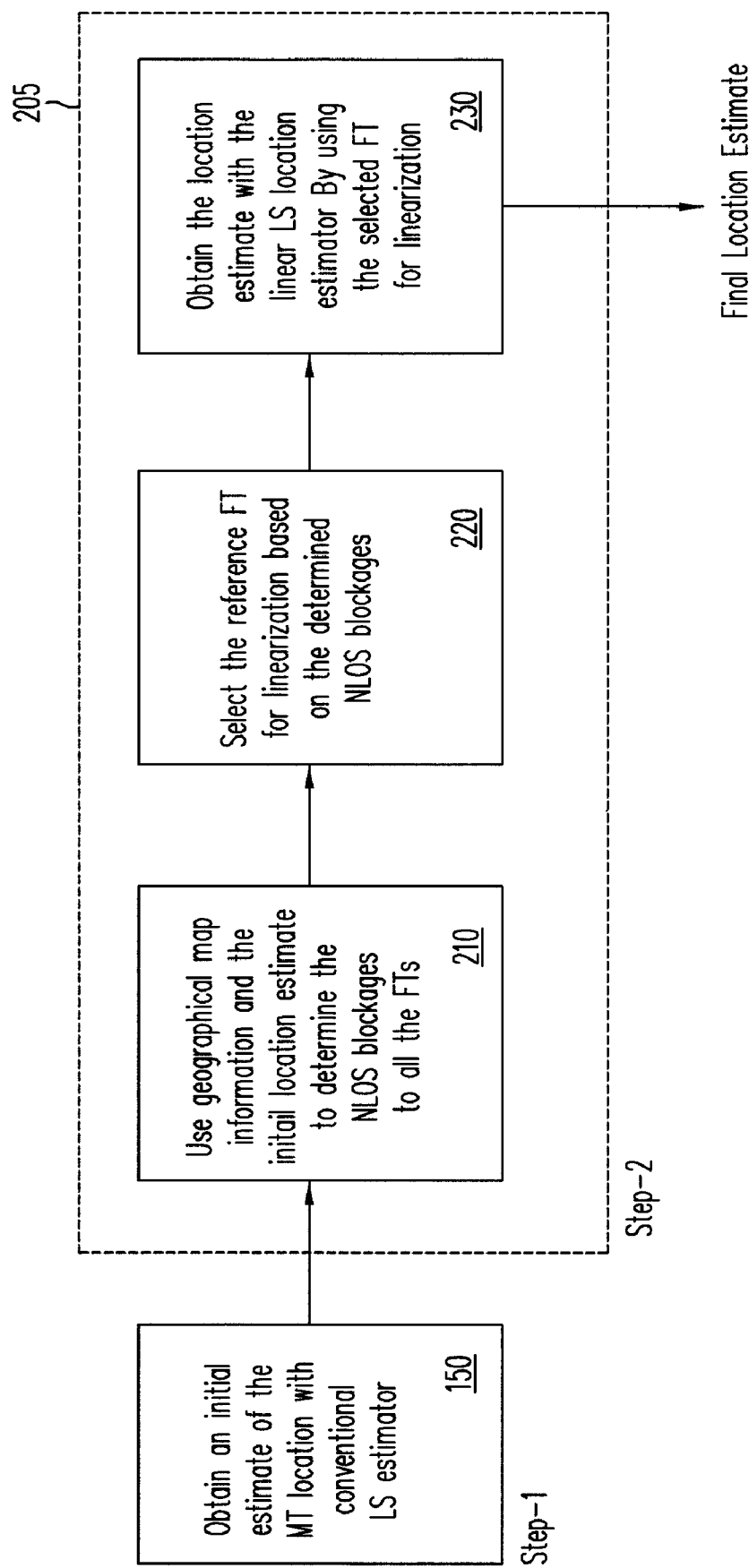
FIG. 6 is a block diagram illustrating the two-step location estimator for NLOS conditions, according to one embodiment of the present invention.

FIG. 6 is a block diagram illustrating the two-stage location estimator for NLOS conditions, according to one embodiment of the present invention. As shown in FIG. 6, at step 150 (the "first stage"), an initial estimate of the MT location is obtained using a linear LS estimator. This initial estimate can be obtained using equation (9), with an arbitrarily selected reference FT (referred to FT-r) for linearization. Stage 205 (the "second stage") includes steps 210, 220 and 230. At step 210, geographical map information is used to determine which FTs are under NLOS conditions relative to the MT, based on the initial estimate of the MT location. If the map provides information about the NLOS bias values introduced by the obstructions in the map, that information is recorded. For example, how much delay a door, a wall, or a building is introduced may be determined from the map At step 220, based on the initial estimate of MT's location, a reference FT is selected for linearization, taking into account which FTs are under NLOS conditions. At this step, the reference FT may be selected using the procedures summarized in FIG. 5's flowchart, together with the NLOS bias information determined at step 210. After the reference FT is selected, a final estimate of the MT location is obtained at step 230, after updating the linear model and solving for the MT location using the LLS estimator. In stage 205, the matrix A and vector p are updated using the selected reference FT, and then the final estimate of the MT location is given by equation (9), using the updated reference FT.

Figure 7:
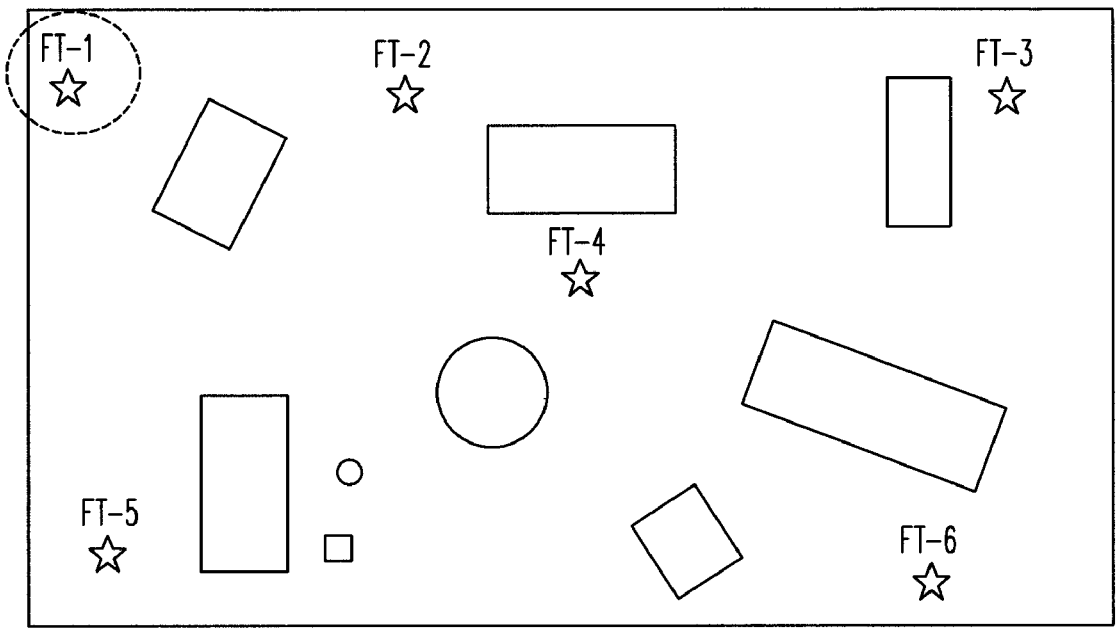
FIG. 7 illustrates step 150 of a two-stage estimator in accordance with the present invention, such as shown in FIG. 5; an initial estimate for the MT location is obtained by arbitrarily selecting a reference FT.

An example to illustrate the 2-stage estimator of the present invention is provided in FIGS. 7-10. FIG. 7 illustrates step 150 of a two-stage estimator in accordance with the present invention, such as shown in FIG. 5. In FIG. 7, an initial estimate for the MT location is obtained by arbitrarily selecting a reference FT. As shown in FIG. 7, six FTs (respectively labeled FT-1, ..., FT-6) are distributed throughout the area. Numerous obstructions are also seen between the FTs and the MT. (The actual location of the MT is indicated by a dark solid square.) At step 150, as discussed above, an initial estimate of the MT's location (indicated by the dark solid circle) is obtained by arbitrarily selecting a reference FT (e.g., FT-1). (Note that selection of FT-1 as the reference FT is disadvantageous for two reasons; first, it is not the closest FT to the MT, and second, there is obstruction between FT-1 and the MT.)

Figure 8:
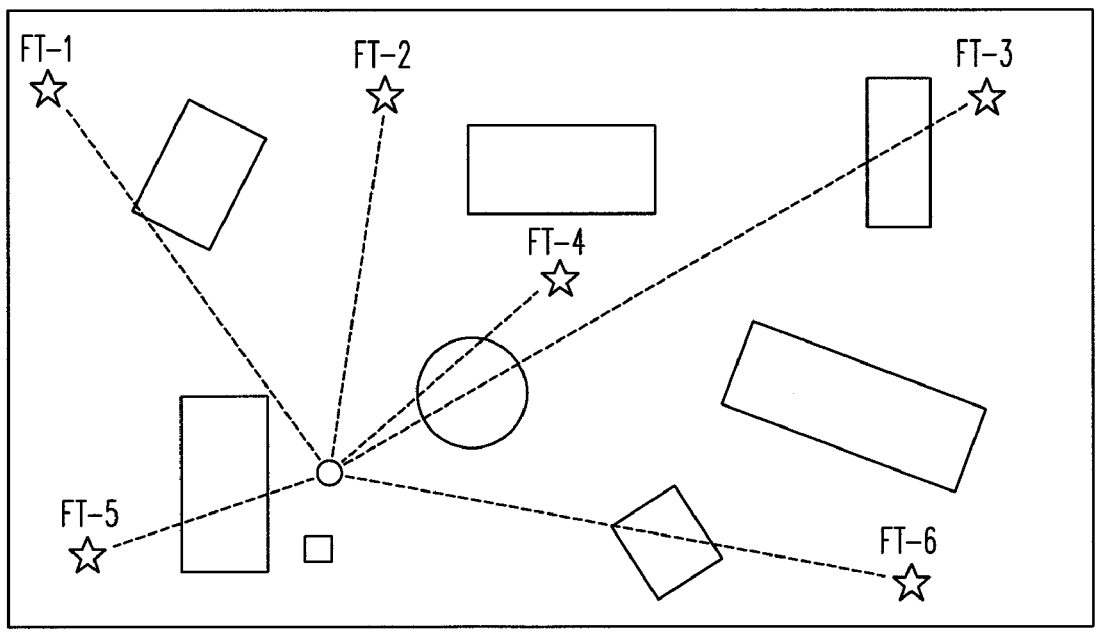
FIG. 8 illustrates step 210 of the two-stage estimator of FIG. 6; the FTs which are under NLOS conditions relative to the MT are determined based on the initial estimate, and, if possible from the available map, where the amount of NLOS bias with respect to each of the FTs are evaluated.
Figure 9:
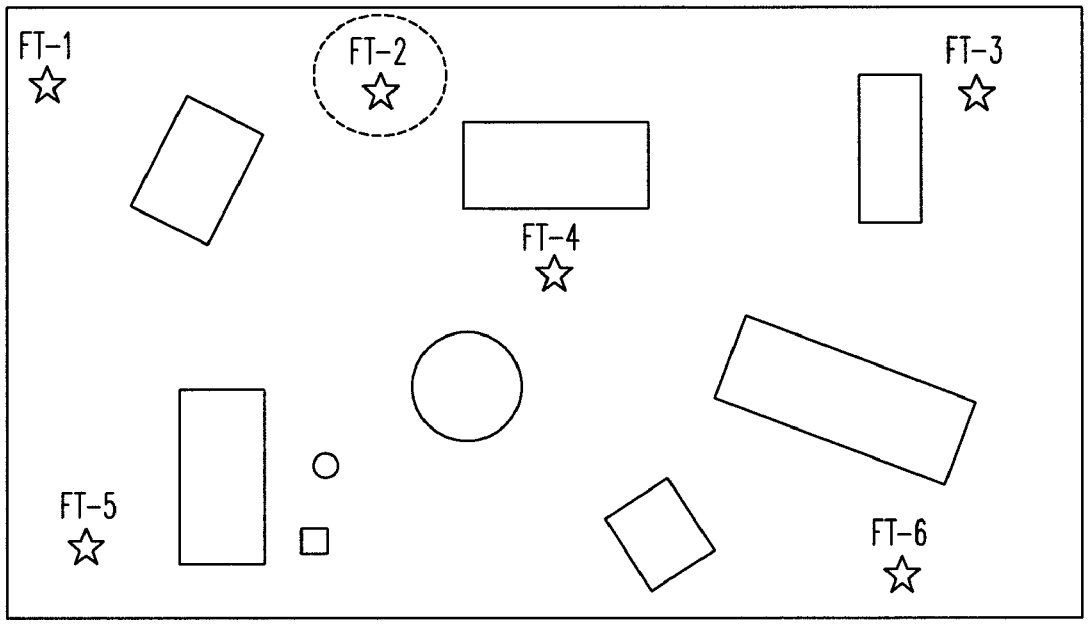
FIG. 9 illustrates step 220 of the two-stage estimator of FIG. 6; the reference FT is selected based on the NLOS bias information and certain decision criteria.
Figure 10:
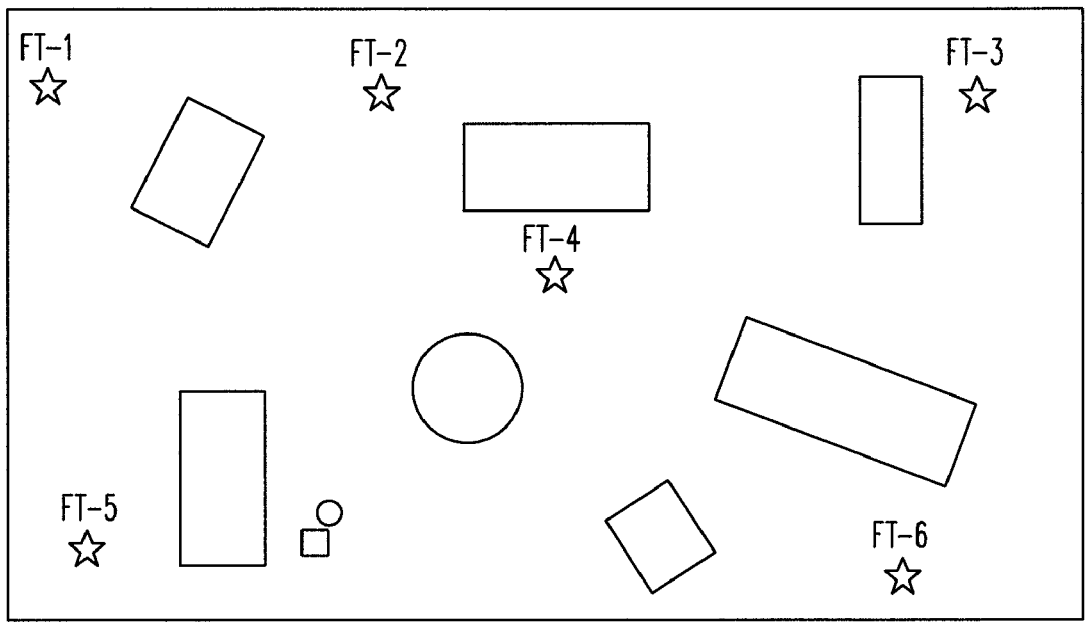
FIG. 10 illustrates step 230 of the two-stage estimator of FIG. 6; the LLS estimator is repeated with the reference FT selected at step 220, using the corrected measurements resulting from the NLOS information.

FIG. 8 illustrates step 210 of the two-stage estimator of FIG. 6; the FTs which are under NLOS conditions relative to the MT are determined based on the initial estimate, and, if possible from the available map, where the amount of NLOS bias with respect to each of the FTs are evaluated. Based on the map of FIGS. 7-8, FT-2 is a LOS FT, which is relatively closer to the MT, as compared to all the other FTs (e.g., FT-1, FT-3, and FT-6). Hence, FT-2 is selected to be the reference FT for linearizing the system at step 220, which is illustrated in FIG. 9. FIG. 10 illustrates step 230 of the two-stage estimator of FIG. 6; the LLS estimator is repeated with the reference FT selected at step 220, using the corrected measurements resulting from the NLOS information.

Thus, the present invention improves accuracy of an LLS localization estimator through selection of a reference FT, and by using covariance matrix-based methods. The methods of the present invention are applicable to a large number of communication networks where localization is achieved by distance measurements (such as cellular, UWB, WLAN, and WiMAX networks). The methods of the present invention apply to both TOA-based and RSS-based localizations. These methods provide estimators that have minimal computational complexity.

Of these methods, reference FT selection is simpler than covariance matrix-based methods. According to simulation results, a method based on FT selection alone is only slightly less accurate than a covariance matrix-based method. Therefore, FT selection can be used to initialize more accurate position estimators (e.g., iterative estimators), decreasing the complexity of other estimators because of its accurate initialization. By tuning the covariance matrix, the methods of the present invention are applicable to both LOS and NLOS conditions.

Simulation results show that the methods of the present invention out-perform the averaging techniques of Venkatesh and Li, for example.

The detailed description above is provided to illustrate the specific embodiment of the present invention and is not intended to be limiting. Numerous variations and modification within the scope of the present invention are possible. The present invention is set forth in the following claims.

We claim:

1. A method for localization of a mobile terminal using known positions of a plurality of fixed terminals, comprising:
   at each fixed terminal, receiving a signal from the mobile terminal;
   for each fixed terminal, estimating a square of a distance separating the known location for the fixed terminal from the mobile terminal based upon the received signal;
   selecting a single reference terminal from the fixed terminals that is closest to the mobile terminal to reduce a mean squared error for the localization of the mobile terminal, the single reference terminal being located at a reference position and corresponding to a squared reference distance to the mobile terminal, the plurality of fixed terminals thereby corresponding to the single reference terminal and a remaining set of fixed terminals;
   deriving linear equations from the squared distances, the squared reference distance, the reference location, the known locations for the remaining set of fixed terminals, and a covariance matrix that measures covariances resulting from the linear equation derivation; and
   determining the position of the mobile terminal using a location estimator on the linear equations.

2. A method as in claim 1, wherein the selection of the reference terminal excludes fixed terminals under non-line-of-sight (NLOS) conditions relative to the mobile terminal.

3. A method as in claim 2, wherein the selection of the reference terminal includes a fixed terminal under NLOS conditions provided the measured distance between the fixed terminal and the mobile terminal is less than a predetermined threshold.

4. A method as in claim 1, wherein the location estimator comprises a linear least squares (LLS) estimator.

5. A method as in claim 1, wherein the location estimator comprises a maximum likelihood (ML) estimator.

6. A method as in claim 5, wherein the linear equations include noise and non-line-of-sight (NLOS) bias in the measured distance between each fixed terminal and the mobile terminal.

7. A method as in claim 6, wherein the covariance matrix is calculated using values of one or more of the NLOS biases.

8. A method as in claim 6, wherein the covariance matrix is calculated using variances of one or more of the NLOS biases.

9. A method as in claim 6, wherein the measured distances are corrected for measured values of the NLOS biases.

10. A method as in claim 6, wherein the measured distances are corrected for expected values of the NLOS biases.

11. A method as in claim 1, wherein the measured distances are calculated from time-of-arrival measurements.

12. A method as in claim 1, wherein the measured distances are calculated from received signal strength measurements.

13. A method as in claim 1, further comprising, prior to selecting the single reference terminal:
   providing an initial estimate of the location of the mobile terminal; and
   based on the initial estimate and geographical map information, determining an existence of non-line-of-sight (NLOS) condition between each fixed terminal and the mobile terminal.

14. A method as in claim 13, wherein the selecting the single reference terminal further takes into account the determined NLOS conditions.

15. A method as in claim 1, wherein the selection of the reference terminal comprises selecting as the single reference terminal the fixed terminal having the least measured noise variance.

16. A method as in claim 1, wherein the selection of the reference terminal comprises selecting as the single reference terminal the fixed terminal having the least noise standard deviation and distance product.

* * * * *